(12) United States Patent
Ostojic et al.

(10) Patent No.: US 10,384,935 B2
(45) Date of Patent: Aug. 20, 2019

(54) FUNCTIONALIZATION OF CARBON NANOTUBES WITH METALLIC MOIETIES

(75) Inventors: Gordana Ostojic, Evanston, IL (US); Mark C. Hersam, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 1068 days.

(21) Appl. No.: 12/498,837

(22) Filed: Jul. 7, 2009

(65) Prior Publication Data

US 2010/0173376 A1 Jul. 8, 2010

Related U.S. Application Data

(60) Provisional application No. 61/078,521, filed on Jul. 7, 2008.

(51) Int. Cl.
*B82Y 30/00* (2011.01)
*B82Y 40/00* (2011.01)
*C01B 32/174* (2017.01)

(52) U.S. Cl.
CPC ............... *B82Y 30/00* (2013.01); *B82Y 40/00* (2013.01); *C01B 32/174* (2017.08); *C01B 2202/02* (2013.01); *C01B 2202/06* (2013.01); *C01B 2202/28* (2013.01)

(58) Field of Classification Search
CPC ..... B82Y 30/00; B82Y 40/00; C01B 31/0273; C01B 2202/28; C01B 2202/06; C01B 2202/02
USPC ............................. 506/9; 530/324, 327, 350
IPC ........................................................ C07K 14/00
See application file for complete search history.

(56) References Cited

U.S. PATENT DOCUMENTS

| | | | |
|---|---|---|---|
| 5,107,007 A | 4/1992 | Farrell | |
| 6,958,216 B2 | 10/2005 | Kelley et al. | |
| 7,385,266 B2 * | 6/2008 | Segal | G01N 27/4146 257/414 |
| 7,527,780 B2 * | 5/2009 | Margrave et al. | 423/447.2 |
| 7,662,298 B2 * | 2/2010 | Hersam et al. | 210/781 |
| 7,759,488 B2 * | 7/2010 | Xiao | C07F 15/0093 546/2 |
| 7,786,540 B2 * | 8/2010 | Segal et al. | 257/414 |
| 7,968,489 B2 * | 6/2011 | Ma et al. | 502/185 |
| 2002/0172963 A1 * | 11/2002 | Kelley | B01J 23/75 506/39 |
| 2007/0154891 A1 | 7/2007 | Cha | |
| 2007/0292896 A1 | 12/2007 | Strano et al. | |
| 2008/0063587 A1 | 3/2008 | Strano et al. | |
| 2008/0217588 A1 | 9/2008 | Arnold et al. | |
| 2009/0061194 A1 | 3/2009 | Green et al. | |
| 2009/0062785 A1 | 3/2009 | Harrison, Jr. et al. | |
| 2009/0068241 A1 | 3/2009 | Britz et al. | |
| 2009/0092836 A1 | 4/2009 | Geckeler et al. | |
| 2009/0155163 A1 | 6/2009 | Kang et al. | |
| 2009/0173918 A1 | 7/2009 | Hersam et al. | |

OTHER PUBLICATIONS

Arnold et al., 2006. Sorting carbon nanotubes by electronic structure using density differentiation. Nature Nanotechnology, vol. 1, pp. 60-66, 2006.*
Gao, Xueyun, et al. "Detection of trace Hg2+ via induced circular dichroism of DNA wrapped around single-walled carbon nanotubes." Journal of the American Chemical Society 130.29 (2008): 9190-9191. (Year: 2008).*
Ono, Akira, and Humika Togashi. "Highly selective oligonucleotide-based sensor for mercury (II) in aqueous solutions." Angewandte Chemie International Edition 43.33 (2004): 4300-4302. (Year: 2004).*
Arnold et al., "Encapsulation of Carbon Nanotubes by Self-Assembling Peptide Amphiphiles," *Langmuir*, 21:4705-4709 (2005).
Arnold et al., "Enrichment of Single-Walled Carbon Nanotubes by Diameter in Density Gradients," *Nano Letters*, 5(4):713-718 (2005).
Barone et al., "Near-infrared optical sensors based on single-walled carbon nanotubes," *Nature Materials*, 4:86-92 (2005).
Besteman et al., "Enzyme-Coated Carbon Nanotubes as Single-Molecule Biosensors," *Nano Letters*, 3(6):727-730 (2003).
Cheng et al., "Synthesis of nickel nanoparticles and carbon encapsulated nickel nanoparticles supported on carbon nanotubes," *Journal of Solid State Chemistry*, 179:91-95 (2006).
Day et al., "Factors Controlling the Electrodeposition of Metal Nanoparticles on Pristine Single Walled Carbon Nanotubes," *Nano Letters*, 7(1):51-57 (2007).
Govindaraj et al., "Metal Nanowires and Intercalated Metal Layers in Single-Walled Carbon Nanotube Bundles," *Chem. Mater.*, 12:202-205 (2000).
Guo et al., "High dispersion and electrocatalytic properties of palladium nanoparticles on single-walled carbon nanotubes," *Journal of Colloid and Interface Science*, 286:274-279 (2005).
Hersam, "Progress towards monodisperse single-walled carbon nanotubes," Nature Nanotechnology, 3:387-394 (2008).
Huang et al., "One-Dimensional Self-Assembly of Metallic Nanostructures on Single-Walled Carbon-Nanotube Bundles," Small, 2(12):1418-1421 (2006).
Kam et al., "Carbon nanotubes as multifunctional biological transporters and near-infrared agents for selective cancer cell destruction," *PNAS*, 102(33):11600-11605 (2005).
Kong et al., "Functionalized Carbon Nanotubes for Molecular Hydrogen Sensors," *Adv. Mater.*, 13(18):1384-1386 (2001).
Kongkanand et al., "Highly Dispersed Pt Catalysts on Single-Walled Carbon Nanotubes and Their Role in methanol Oxidation," *J. Phys. Chem. B.*, 110(33):16185-16188 (2006).

(Continued)

*Primary Examiner* — Robert J Yamasaki
(74) *Attorney, Agent, or Firm* — Locke Lord LLP; Tim Tingkang Xia, Esq.

(57) ABSTRACT

A method of functionalizing carbon nanotubes with metallic moieties is disclosed. Carbon nanotubes are first associated with one or more binding moieties to provide carbon nanotubes encapsulated by the binding moieties. The encapsulated carbon nanotubes are then contacted with a metal salt or a metal complex that binds to the binding moieties. Reduction of the metal salt or metal complex provides carbon nanotubes functionalized with metal nanoparticles.

10 Claims, 10 Drawing Sheets

(56) References Cited

OTHER PUBLICATIONS

Ou et al., "High-Density Assembly of Gold nanoparticles on Multiwalled Carbon Nanotubes Using 1-Pyrenemethylamine as Interlinker," *J. Phys. Chem. B.*, 110(5):2031-2036 (2006).

Pantarotto et al., "Synthesis, Structural Characterization, and Immunological Properties of Carbon Nanotubes Functionalized with Peptides," *J. Am. Chem. Soc.*, 125(20):6160-6164 (2003).

Qu et al., "Shape/Size-Controlled Syntheses of Metal Nanoparticles for Site-Selective Modification of Carbon Nanotubes," *J. Am. Chem. Soc.*, 128(16):5523-5532 (2006).

Ren et al., "Deposition of metallic nanoparticles on carbon nanotubes via a fast evaporation process," *Nanotechnology*, 17:5596-5601 (2006).

Strano et al., "Understanding the Nature of the DNA-Assisted Separation of Single-Walled Carbon Nanotubes Using Fluorescence and Raman Spectroscopy," *Nano Letters*, 4(4):543-550 (2004).

Sun et al., "Electrodeposition of Pd nanoparticles on single-walled carbon nanotubes for flexible hydrogen sensors," *Applied Physics Letters*, 90:213107-1-213107-3 (2007).

Taft et al., "Site-Specific Assembly of DNA and Appended Cargo on Arrayed Carbon Nanotubes," *J. Am. Chem. Soc.*, 126(40):12750-12751 (2004).

Xie et al., "Functionalized carbon nanotubes in platinum decoration," *Smart Mater. Struct.*, 15:S5-S8 (2006).

Yuan et al., "Deposition of Silver Nanoparticles on Multiwalled Carbon Nanotubes Grafted with Hyperbranched Poly(amidoamine) and Their Antimicrobial Effects," *J. Phys. Chem. C*, 112:18754-18759 (2008).

Zheng et al., "DNA-assisted dispersion and separation of carbon nanotubes," *Nature Materials*, 2:338-342 (2003).

Arnold et al., "Hydrodynamic Characterization of Surfactant Encapsulated Carbon Nanotubes Using an Analytical Ultracentrifuge," *ACS Nano.*, 2(11):2291-2300 (2008).

Arnold et al., "Sorting carbon nanotubes by electronic structure using density differentiation," *Nature Nanotechnology*, 1:60-65 (2006).

Bianco et al., "Applications of carbon nanotubes in drug delivery," *Current Opinion in Chemical Biology*, 9:674-679 (2005).

Feazell et al., "Soluble Single-Walled Carbon Nanotubes as Longboat Delivery Systems for Platinum(IV) Anticancer Drug Design," *J. Am. Chem. Soc.*, 129:8438-8439 (2007).

Green et al., "Ultracentrifugation of single-walled nanotubes," *Materialstoday*, 10(12)59-60 (2007).

Hu et al., "DNA Functionalized Single-Walled Carbon Nanotubes for Electrochemical Detection," *J. Phys. Chem. B.*, 109(43)20072-20076 (2005).

Li et al., "DNA-Directed Self-Assembling of Carbon Nanotubes," *J. Am. Chem. Soc.*, 127:14-15 (2005).

Satishkumar et al., "The decoration of carbon nanotubes by metal nanoparticles," *J. Phys. D. Appl. Phys.*, 29:3173-3176 (1996).

Tsang et al., "Immobilization of Platinated and Iodinated Oligonucleotides on Carbon Nanotubes," *Angew. Chem. Int. Ed. Engl.*, 36(20):2197-2200 (1997).

Zacharia et al., "Spillover of physisorbed hydrogen from sputter-deposited arrays of platinum nanoparticles to multi-walled carbon nanotubes," *Chemical Physics Letters*, 434:286-291 (2007).

\* cited by examiner

FUNCTIONALIZATION OF CARBON NANOTUBES WITH METALLIC MOIETIES

CROSS REFERENCE TO RELATED APPLICATION

This application claims priority to and the benefit of U.S. Provisional Patent Application Ser. No. 61/078,521, filed on Jul. 7, 2008, the entire disclosure of which is incorporated by reference herein.

STATEMENT REGARDING FEDERALLY SPONSORED RESEARCH OR DEVELOPMENT

This invention was made with government support under DE-FG02-03ER15457 awarded by the Department of Energy, and DAMD17-05-1-0381 awarded by the United States Army Telemedicine and Advanced Technology Research Center. The government has certain rights in the invention.

BACKGROUND

Carbon nanotubes possess numerous desirable properties including excellent mechanical strength, sensitivity to their surroundings, ability to carry high currents, and distinct absorption and luminescence peaks. These properties have been exploited in a wide range of applications such as transistors and interconnects in electrical circuits, mechanical oscillators, sensors, and solar cells. In an effort to enhance their properties and thus enable further applications, a variety of schemes have been developed for covalently and noncovalently functionalizing carbon nanotubes. In many cases, noncovalent functionalization is preferred since it retains the superlative properties of the underlying nanotube.

A variety of metals (e.g., gold (Au), platinum (Pt), palladium (Pd), and copper (Cu)) have been successfully affixed to carbon nanotubes. In particular, Pt nanoparticles have been bound to nanotubes via Pt evaporation or electrodeposition on nanotube mats, binding to functional groups on the nanotube surface or an encapsulating polymer, and physisorption. Deposition of Pt on carbon nanotubes has been shown to increase chemical reactivity (e.g., catalytic activity and hydrogen storage capacity) compared to carbon black substrates and holds promise for improved hydrogen storage devices and fuel cells. For these applications, Pt nanoparticle growth on dispersed carbon nanotubes is desirable because it enables enhanced surface coverage, reactant accessibility, and surface area-to-volume ratio.

However, the above prior art methods present various drawbacks such as weak bonding, limited surface area-to-volume ratio, and nanotube surface damage that can degrade the desirable optoelectronic performance of unperturbed (or pristine) nanotubes. Accordingly, there is a need in the art for new methods to functionalize carbon nanotubes with metallic moieties that can overcome at least some of these drawbacks.

SUMMARY

In light of the foregoing, the present teachings provide methods of functionalizing carbon nanotubes with metallic moieties while preserving the integrity of the nanotube surface (e.g., no carbon-carbon bonds are broken), which methods can overcome various deficiencies and shortcomings of the prior art, including those outlined above.

The present teachings also can provide functionalized nanotubes having new and/or improved properties, for example, catalytic activity and/or biological functionality, that allow their applications in fields such as alternative energy, biotechnology, catalysis, sensors, and information technology.

In one aspect, the present teachings relate to a method of functionalizing a nanotube with a metallic moiety. The method can include non-covalently associating a binding moiety with a nanotube and binding a metallic moiety to the binding moiety. For example, the binding moiety can encapsulate or wrap around the sidewall of the nanotube. In certain embodiments, the binding moiety can be a biological moiety such as a nucleic acid, an oligonucleotide, an amino acid, an enzyme, a protein, a chemically derivatized nucleic acid, a chemically derivatized oligonucleotide, a chemically derivatized amino acid, a chemically derivatized enzyme, a chemically derivatized protein, or a segment thereof. For example, the biological moiety can be an oligonucleotide, for example, a single-stranded DNA (ssDNA), a double-stranded DNA (dsDNA), an RNA, or a segment or derivative thereof.

As used herein, a "metallic moiety" can refer to a metal in elemental form, a metal ion, or any metal-containing compound (e.g., a metal salt and a metal complex), and can be neutral or charged. In some embodiments, the metallic moiety can include a catalytic or precious metal such as platinum (Pt), gold (Au), silver (Ag), palladium (Pd), and copper (Cu). In certain embodiments, the metallic moiety can be a metallic compound that covalently bonds (e.g., forms coordinate covalent bonds) with the binding moiety. The bonding between the metallic moiety and the binding moiety can lead to the formation of an adduct. In certain embodiments, the metallic moiety can be a reducible metallic compound which after reduction, can be converted to a metal particle (e.g., a metal nanoparticle). Specific examples of metallic moieties that can be used in the present method include Pt complexes and Pt salts such as cisplatin and potassium tetrachloroplatinate, and Pt nanoparticles.

In some embodiments, the metallic moiety can be a crosslinking agent that crosslinks the binding moiety. The crosslinking can be intermolecular or intramolecular. In particular embodiments, the binding moiety can be a single-stranded DNA (ssDNA) and the metallic moiety can be a compound capable of crosslinking oligonucleotides (e.g., a known DNA crosslinker). When the two are contacted with each other, the crosslinking metallic moiety can bind to the ssDNA and cause intrastrand crosslinking, which can lead to stronger binding between the ssDNA and the metallic moiety and/or stronger association between the ssDNA and the nanotube (for example, due to conformational changes in the ssDNA). In other embodiments where the binding moiety is a double-stranded DNA (dsDNA), the crosslinking metallic moiety can lead to intrastrand and/or interstrand crosslinking of the dsDNA.

In some embodiments, the metallic moiety can be a reducible metallic compound which after binding to the binding moiety can be reduced to provide a metal nanoparticle. The metal nanoparticle can remain bound to the binding moiety while the binding moiety remains noncovalently associated with the nanotube. Via the binding moiety, the metal nanoparticle noncovalently functionalizes the nanotube and can be in electronic contact or communication with the nanotube. The present method therefore provides nanotubes that are "decorated" with metal nanoparticles on their surface. Because the metal nanoparticles and the binding moiety are noncovalently bound to the nanotube surface, the integrity of the nanotube surface can be preserved to retain the inherent and desirable properties of the underlying nanotubes. By choosing a metallic moiety that covalently binds to the binding moiety, the association of the metallic nanoparticles to the nanotube surface can be strengthened.

To further enhance the properties of the functionalized nanotubes, the nanotubes can be pre-sorted according to one or more properties such as chirality, nanotube diameter, and electronic type. In some embodiments, the present method can include providing a mixed population of nanotubes (e.g., carbon nanotubes) that includes a range of at least one of chirality, nanotube diameter, and electronic type; contacting the mixed population of nanotubes with one or more surface active components in a solvent to provide a dispersion; introducing the dispersion into a fluid medium that includes a density gradient; agitating the fluid medium to separate along the density gradient the carbon nanotubes (via the nanotube/binding moiety complexes) by at least one of chirality, nanotube diameter, and electronic type; allowing carbon nanotubes differing by at least one of chirality, nanotube diameter, and electronic type to sediment into a plurality of separable fractions; and collecting a first separation fraction from the plurality of separable fractions that has a narrower range or distribution of nanotubes in terms of at least one of chirality, nanotube diameter, and electronic type when compared to the mixed population. In other words, the first separation fraction can be considered enriched with nanotubes of the one or more selected properties relative to the mixed population. The process described can be repeated iteratively (with or without changes to the separation conditions between any two separations) to further increase the enrichment factor.

In addition to its ability to disperse or debundle carbon nanotubes, the one or more surface active components can allow separation along the density gradient by associating with debundled, individual nanotubes. In particular, the one or more surface active components can associate with individual nanotubes in such a way that individual nanotubes differing by at least one of chirality, nanotube diameter, and electronic type, will have different buoyant densities in the solvent. For example, the nanotubes in the first separation fraction can have a narrower range in terms of nanotube diameter when compared to the mixed population. In particular, the first separation fraction can be enriched with or have a high percentage of nanotubes that have a desired diameter range (e.g., between about 7 Å and about 10 Å, or between about 12 Å and about 15 Å). The diameter range can be very narrow such that, for example, greater than about 75% of the carbon nanotubes have a diameter within less than about 0.5 Å of the mean diameter of the nanotube population in the first separation fraction. In certain embodiments, the nanotubes can be sorted by their electronic type such that carbon nanotubes in the first separation fraction can be predominantly semiconducting (or metallic). Similarly, the carbon nanotubes can be sorted by their chirality.

In certain embodiments, the surface active component(s) can be the binding moiety, which eliminates the need to remove the surface active components and contact the nanotubes with a different moiety that acts as the binding moiety. Regardless, after sorting, the sorted nanotubes can be contacted with the binding moiety (if the binding moiety is not used as the surface active component), and subsequently, the formed complex can be contacted with the metallic moiety. The metallic moiety then can bind to the one or more binding moieties already associated with the individual nanotubes, and optionally reduced to its elemental form as described herein. The resulting composite can be subjected to various post-functionalization treatments such as annealing.

Also embraced within the scope of the present teachings are composites including a nanotube, a binding moiety associated with the nanotube, and a metallic moiety binding to the binding moiety, as well as devices incorporating such composites. For example, the present composites can be used to prepare various components in sensors (e.g., chemical sensors, biosensors, and optical sensors), fuel cells (e.g., proton exchange membrane (PEM) fuel cells and direct methanol fuel cells), electrochemical devices (e.g., transistors and interconnects in electrical circuits), solar cells, and hydrogen storage devices. More specifically, the composites can be used to prepare a supported catalyst or an electrode in the devices described herein.

The foregoing, other features, and advantages of the present teachings, will be more fully understood from the following figures, description, and claims.

BRIEF DESCRIPTION OF DRAWINGS

It should be understood that certain drawings are not necessarily to scale, with emphasis generally being placed upon illustrating the principles of the present teachings. The drawings are not intended to limit the scope of the present teachings in any way.

DETAILED SPECIFICATION

Figure 1A:
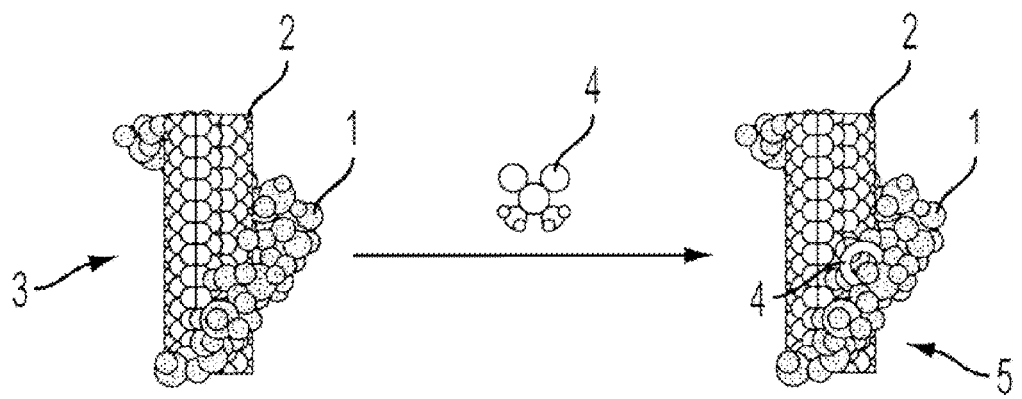
FIGS. 1a and 1b are schematic diagrams showing a metallic moiety binding to a biological moiety associated with a nanotube (FIG. 1a), and a metallic moiety binding to a biological moiety without the nanotube (FIG. 1b).

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

The present teachings provide a method to functionalize a nanotube with metallic moieties. Generally, the present method includes non-covalently functionalizing a nanotube with a binding moiety, and binding a metallic moiety to the binding moiety. Because the nanotube does not form covalent bonds with either the binding moiety or the metallic moiety, the integrity of the nanotube surface is preserved, along with the intrinsic optoelectronic properties of the pristine nanotube. Despite the non-covalent functionalization, the resulting composite exhibits strong electronic coupling between the metallic moieties and the nanotube. In addition, the resulting composite can be soluble in aqueous solutions, thus ensuring its processability in potential applications such as alternative energy (e.g., fuel cells), catalysis, biotechnology, biosensors, chemical sensors, and information technology.

As used herein, a "nanotube" refers to an elongated hollow structure having a nanoscale diameter, e.g., less than about 50 nm and usually less than about 10 nm, and typically a very high aspect ratio. The present teachings can be practiced on various elemental or molecular nanotubes including carbon, boron, BN, $WS_2$, and $MoS_2$. As such, while the description and examples herein may refer specifically to carbon nanotubes, the present teachings are intended to encompass nanotubes in general regardless of their composition. Further, the present teachings can apply analogously to both single-walled nanotubes, e.g., single-walled carbon nanotubes (SWNTs) as well as nanotubes with more than one carbon shell, i.e., multi-walled nanotubes such as multi-walled carbon nanotubes (MWNTs) including double-walled nanotubes such as double-walled carbon nanotubes (DWNTs).

According to the present teachings, a nanotube is contacted first with a binding moiety. In various embodiments, the binding moiety can be selected from a variety of small molecule or polymeric compounds that can associate non-covalently with a nanotube, that is, the binding moiety does not chemically modify or form covalent bonds with the nanotube surface. For example, the binding moiety can encapsulate or wrap around the sidewall (circumference) of the nanotube. In some embodiments, the binding moiety may arrange itself around the sidewall of the nanotube as a helical monolayer. However, other arrangement, e.g., longitudinal or annular arrangement, can be possible. In various embodiments, the nanotube is a pristine nanotube, meaning that it is as-synthesized and has not been subjected to chemical treatment (e.g., acid oxidation). For example, a pristine carbon nanotube typically does not have broken carbon-carbon bonds and/or covalent functional groups on its surface.

In practice, the method can include contacting a population of nanotubes in a solvent with one or more binding moieties, whereby the binding moieties help to disperse or debundle the population of nanotubes by encapsulating individual nanotubes. In various embodiments, the solvent can be water or an aqueous solution. In other embodiments, the solvent can include one or more organic solvents, or an aqueous mixture thereof.

In various embodiments, the binding moiety can be a biological moiety that can associate non-covalently with carbon nanotubes and to which a variety of metallic moieties can bind. In some embodiments, the binding moiety can be a biological moiety that is electrically conductive. In certain embodiments, the binding moiety can be a biological moiety such as a nucleic acid, an oligonucleotide, an amino acid, an enzyme, a protein, a segment or a derivative thereof, or a combination of the foregoing. In certain embodiments, the biological moiety can be a chemically derivatized nucleic acid, a chemically derivatized oligonucleotide, a chemically derivatized amino acid, a chemically derivatized enzyme, a chemically derivatized protein, or a segment thereof. In some embodiments, the biological moiety can be an enzyme that use metals as cofactors in its reaction. In some embodiments, the biological moiety can be an oligonucleotide rich in guanine. In some embodiments, the biological moiety can be an oligonucleotide having between 10-50 (e.g., between 10-30) bases or base pairs. In particular embodiments, the biological moiety can be a deoxyribonucleic acid (DNA), a ribonucleic acid (RNA), or a segment or a derivative thereof. For example, the biological moiety can be a single-stranded DNA (ssDNA), a chemically derivatized ssDNA, a double-stranded DNA (dsDNA), a chemically derivatized dsDNA, an RNA, or a segment thereof, which optionally can be rich in guanine. In various embodiments, the binding moiety can include a substituent known to bond with certain metal atoms. For example, the binding moiety can include one or more sulfur-containing substituents selected from a thiol group, a thiophenol group, a thiocarboxylic acid group, a disulfide group, and combinations thereof. The binding moiety also can be substituted with one or more carboxylic acid groups.

In various embodiments, the metallic moiety can be a metal complex or a metal salt which includes one or more organic moieties that bond or coordinate with one or more functional groups of the binding moiety. In certain embodiments, the metallic moiety can be a salt or complex that is easily reducible (e.g., by common reducing agents) into its elemental form. For example, the metallic moiety can be a salt selected from a chloride salt, a nitrate salt, a sulfate salt, an acetate salt, and hydrates thereof, or a complex having one or more ligands selected from halides, sulphates, phosphates, nitrates, carboxylates, and amines. In certain embodiments, the metallic moiety can include a transition metal (Groups 3 to 12) such as Pt, Au, Ag, Pd, Cu, rhodium (Rh), ruthenium (Ru), iron (Fe), cobalt (Co), and nickel (Ni). In particular embodiments, the metallic moiety can include a catalytic or precious metal such as Pt, Au, Pd, and Cu.

Specific examples of metallic moieties that can be used in the present method include various platinum (Pt(II) or (Pt(IV)) compounds selected from cisplatin, potassium tetrachloroplatinate ($K_2PtCl_4$), carboplatin, tetraaminoplatinum (II) nitrate, platinum (II) 2,4-pentanedionate, platinum bis(acethylacetonate), and tetraaminoplatinum(II) acetate; various gold compounds selected from hydrogen tetrachloroaurate (III) ($HAuCl_4.nH_2O$), potassium tetrachloroaurate (II) ($KAuCl_4$), sodium tetrachloroaurate (III) dihydrate ($NaAuCl_4.2H_2O$), gold (III) bromide hydrate ($AuBr_3.nH_2O$), gold (III) chloride ($AuCl_3$), gold nitrate ($AgNO_3$) gold (III) chloride hydrate ($AuCl_3.nH_2O$), and gold (III) chloride trihydrate ($AuCl_3.3H_2O$); palladium compounds such as potassium tetrachloropalladate ($K_2PdCl_4$), tetraaminopalladium acetate, and palladium bis(acetylacetonate); rhodium compounds such as rhodium acetate and rhodium tris(acethlacetonate); and ruthenium compounds such as ruthenium acetate and ruthenium tris(acetylacetonate). In particular embodiments, the metallic moiety is a platinum compound such as cisplatin and $K_2PtCl_4$.

The metallic moiety can bind to the binding moiety via different mechanisms including physisorption, ionic bonding, covalent bonding, complexation, or combinations thereof. In some embodiments, the bonding between the metallic moiety and the binding moiety can lead to the formation of an adduct (e.g., a salt adduct). In some embodiments, the metallic moiety can form covalent bond(s) (e.g., coordinate covalent bonds) with the binding moiety. In certain embodiments, the metallic moiety can crosslink the binding moiety, i.e., the metallic moiety acts as a crosslinker. For example, in embodiments where the binding moiety is an oligonucleotide such as a DNA, the metallic moiety can be a DNA crosslinker. Various Pt-based chemotherapy drugs are known to bind and cause crosslinking of DNA and can be used according to the present teachings. In embodiments where the binding moiety is an enzyme that uses metal ion cofactors in its reaction, the metallic moiety can be a compound that can bind analogously as the cofactor to the enzyme. The metallic moiety also can be a compound that causes crosslinking in proteins or enzymes. As used herein, a crosslinking metallic moiety can be capable of intramolecular (e.g., intrastrand) and/or intermolecular (e.g., interstrand) crosslinking. In particular embodiments, a crosslinking metallic moiety can be a compound that exhibits specificity for intramolecular (or intrastrand) crosslinking versus intermolecular (or interstrand) crosslinking.

Following the binding of the metallic moiety to the binding moiety, the metallic moiety (or precursor) can be reduced from its complex or salt form to its elemental form, for example, as nanocrystals or nanoparticles. Various reducing agents known in the art can be used. For example, suitable reducing agents include (dimethylamino)borane (DMAB), sodium borohydride ($NaBH_4$), aluminium borohydride ($AlBH_4$), sodium triacetoxyborohydride (Na($CH_3CO_2)_3BH$), sodium cyanoborohydride ($NaBH_3CN$), oxalic acid ($C_2H_2O_4$), sodium oxalate ($Na_2C_2O_4$), potassium oxalate ($K_2C_2O_4$), formaldehyde (HCHO), hydrazine ($N_2H_4$), hydroquinone ($C_6H_4(OH)_2$), and polyols such as ethyleneglycol, diethyleneglycol, para-polyethylene glycol, 1,2-propanediol, and dodecanediol.

The metal nanocrystals or nanoparticles can have a diameter of less than about 10 nm, less than about 8 nm, less than about 5 nm, less than about 3 nm, or less than about 1 nm. The size of the metal nanocrystals or nanoparticles can be controlled by varying the ratio of the metal precursor to the nanotube/binding moiety complex, for example, by varying the molarity of the metal precursor solution. The metal nanoparticles can remain bound to the binding moiety as long as the binding moiety remains noncovalently associated with the nanotube.

The present methods can provide high-density metal-functionalized nanotubes. For example, when single-walled carbon nanotubes were functionalized with Pt nanoparticles, empirical results showed that a Pt precursor solution having a 1 mM concentration can lead to a Pt/C mass ratio of greater than 10. In addition, the metallic moieties often can exhibit stronger interaction and electronic coupling with the nanotube as compared to, for example, simple physisorption, yet the inherent optoelectronic properties of the nanotubes can remain largely unperturbed by the addition of the metal nanoparticles. For example, in embodiments where the binding moiety is electrically conductive and helically wraps around the sidewall of the nanotube, the metallic moiety typically is in good electrical communication with the underlying nanotube. Further, by having the binding moiety as an intermediary between the metallic moiety and the nanotube, the composite as a whole can remain debundled and well-dispersed in water or other suitable solvents due to the dispersant effect provided by the binding moiety. In addition to being a dispersant and a binding layer for the metallic moiety, the binding moiety also can help regulate the uniformity of the growth of the metal nanoparticles by serving as a capping molecule. However, if desired, the metal functionalization also can be easily reversed by removing the binding moiety, as the metallic moiety typically binds strongly to the binding moiety, but is not directly attached to the nanotube itself.

In particular embodiments of the present teachings, the nanotube can be a single-walled carbon nanotube (SWNT), while the binding moiety can be a single-stranded DNA (ssDNA), and the metallic moiety can be a DNA crosslinker such as cisplatin and potassium tetrachloroplatinate.

Figure 1B:
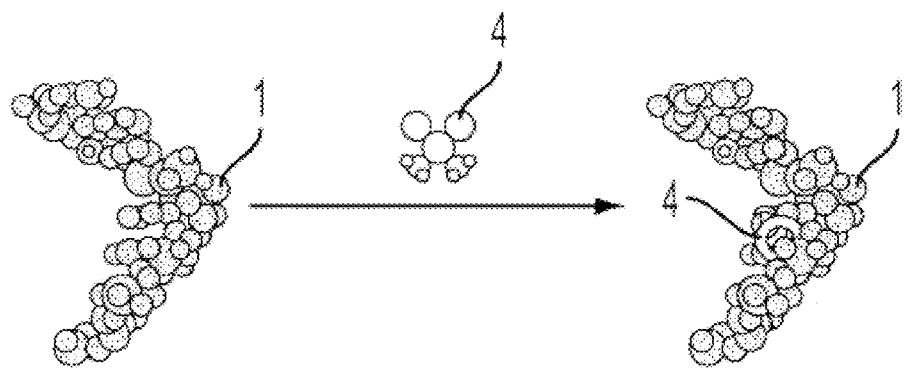

Referring to FIG. 1, a binding moiety 1 (specifically, an ssDNA) is shown encapsulating or wrapping around the sidewall of a nanotube 2. When the SWNT/ssDNA complex 3 is contacted with a metallic moiety 4 (e.g., cisplatin), the metallic moiety binds to and crosslinks the ssDNA. FIG. 1a illustrates the resulting SWNT/ssDNA/Pt composite 5. FIG. 1b illustrates the binding between the metallic moiety 4 and the binding moiety 1 without the nanotube 2.

Figure 4A:
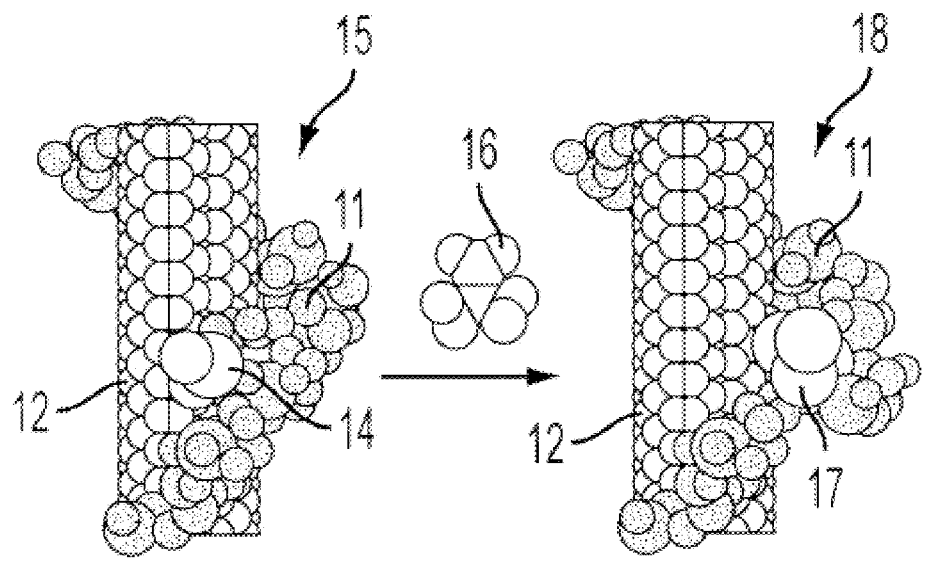
FIGS. 4a and 4b are schematic diagrams showing a metallic moiety bound to a biological moiety associated with a nanotube, followed by reduction and formation of a nanoparticle (FIG. 4a); and a metallic moiety bound to a biological moiety without the nanotube, followed by reduction and nanoparticle formation (FIG. 4b).
Figure 4B:
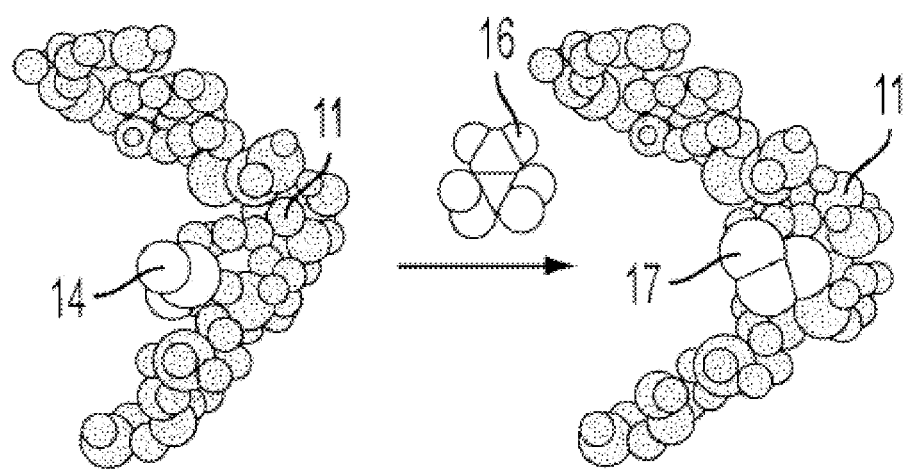

Referring to FIG. 4a, a composite 15 (e.g., an SWNT/ssDNA/Pt composite) including a metallic moiety 14 (e.g., $K_2PtCl_4$) bound to a binding moiety 11 (e.g., ssDNA) encapsulating a nanotube 12 (e.g., ssDNA) is contacted with a reducing agent 16 (e.g., DMAB), to reduce the metal complex into a Pt nanoparticle 17. The resulting composite 18 is a nanotube 12 decorated with a metal nanoparticle 17 via an intermediary binding moiety 11. FIG. 4b illustrates the binding between the metallic moiety (a metallic precursor 14 and a metal nanoparticle 17) and the binding moiety 11 without the nanotube 12.

The present composites (e.g., SWNT/DNA/Pt composites) can provide a unique combination of the catalytic activity of nanoscale platinum, the biological functionality of DNA, and the optoelectronic properties of SWNTs. Together with the other embodiments of the present teachings, these composites suggest a myriad of applications including electrochemical devices, hydrogen storage devices, fuel cells, catalysts, catalytic converters, chemical sensors, and biosensors. For example, the present composites can be used (optionally with other materials) as an electrode of the various devices described herein.

To further enhance the properties of the composites of the present teachings, the nanotubes can be pre-sorted according to one or more properties such as chirality, nanotube diameter, and electronic type. For example, the nanotubes can be pre-sorted using a sorting method based on density gradient ultracentrifugation (DGU) as described in co-pending International Publication Nos. WO 2006/096613, WO 2008/073171, and WO 2009/032090, the entire disclosure of each of which is incorporated by reference herein. Briefly, as-synthesized nanotubes generally are dispersed in an aqueous solution using one or more surface active components. By controlling the type and amount of the surface active components encapsulating the nanotubes, it is possible to engineer subtle differences in the buoyant density of the nanotubes according to their diameter and electronic type. These density differences can then be exploited by centrifuging the nanotube solution inside a density gradient provided by a fluid medium. Over the course of the ultracentrifugation, the different chiralities of SWNTs move independently to their respective isopycnic points, i.e., points inside the gradient at which sedimentation stops due to a matching of the buoyant density of the SWNTs with the buoyant density of the fluid medium. Subsequently, the nanotubes can be removed layer by layer from the density gradient. This general method allows sorting of SWNTs as a function of structure and/or one or more other properties without irreversibly modifying the nanotubes chemically or structurally, and can achieve simultaneous selectivity of diameter and chirality, diameter and electronic type, electronic type and chirality, or independent selectivity of diameter, electronic type, or chirality. Accordingly, the underlying nanotube of the present composite can be semiconducting or metallic, e.g., a semiconducting SWNT or a metallic SWNT, and/or have a specific narrow diameter range (within a diameter range of less than about 1 nm or 10 Å, e.g., less than about 5 Å, less than about 1 Å, or less than about 0.5 Å).

The following examples are provided to illustrate further and to facilitate the understanding of the present teachings and are not in any way intended to limit the invention.

Example 1: DNA Encapsulation of SWNTs

Single-walled carbon nanotubes (purified CoMoCAT, SWNTs) were encapsulated with $(GT)_{10}$ oligonucleotide (AlphaDNA, Canada) in an aqueous solution of 0.1 M sodium chloride using the procedure reported in Zheng et al., *Nat. Mater.*, 2: 338-342 (2003). To remove the excess DNA, the dispersed nanotube solution was dialyzed for four days in 0.1 M NaCl using a 100 kDa dialysis membrane (Float-A-Lyzer, Spectrum Laboratories). Finally, to remove NaCl, an additional dialysis cycle (12 hours) was performed in deionized water.

Example 2: Cisplatin Solution Preparation

A freshly prepared solution of 2 mM cisplatin (Sigma Aldrich) was mixed with DNA-encapsulated SWNTs to obtain a 1 mM Pt concentration and SWNT loading of 5.8 mg/L in a 20 mM NaCl aqueous solution. Similarly, $(GT)_{10}$ (AlphaDNA, Canada) dissolved in deionized water was mixed with cisplatin to obtain the same Pt molarity (1 mM) and 12 µM DNA concentration in 20 mM NaCl buffer. These samples were labeled SWNT/DNA/cisplatin and DNA/cisplatin, respectively. In addition, control samples that contained the same concentration of DNA (12 µM) and DNA-encapsulated SWNTs (5.8 mg/L) but no cisplatin were prepared and labeled DNA and SWNT/DNA, respectively. After seven days of incubation, no visible aggregation was observed in either the SWNT/DNA or SWNT/DNA/cisplatin solution, suggesting that cisplatin does not compromise the dispersion of the SWNTs.

Example 3: Potassium Tetrachloroplatinate Solution Preparation

A freshly prepared solution of 10 mM potassium tetrachloroplatinate (Sigma Aldrich) was mixed with DNA-encapsulated SWNTs to obtain a 1 mM Pt concentration and SWNT loading of 5.8 mg/L. As a control solution, $(GT)_{10}$ dissolved in deionized water was mixed with $K_2PtCl_4$ to obtain the same Pt molarity (1 mM) and 12 µM DNA concentration. These samples were labeled SWNT/DNA/$K_2PtCl_4$ and DNA/$K_2PtCl_4$, respectively. After one week of incubation, both of these solutions were further diluted 2-fold. Then, a heated aqueous solution of (dimethylamino) borane (DMAB, 50 mM) (Fluka) was added drop-wise to each of these solutions to match the molarity of potassium tetrachloroplatinate. The solutions were stirred with an overhanging stirrer inside the water bath at a controlled temperature (45-50° C.) during the reduction process. This procedure was followed by dialysis of all samples in 10 kDa membranes (Pierce) in deionized water for 24 hours. The reduced solutions were labeled DNA/Pt for the control and SWNT/DNA/Pt for the SWNT sample. The final Pt concentration was 0.6 mM. The solutions show increased optical absorption after reduction. However, no precipitates were observed after Pt nanoparticle formation, which suggests that the Pt nanoparticles remain bound to the DNA.

Example 4: Characterization of Sample Solutions Using Optical Absorbance Measurements Optical absorbance was measured in 1 cm or 0.5 cm optical path plastic cuvettes using a Cary 500 UV-vis-NIR spectrophotometer (Keck Biophysics Facility, Northwestern University). Suitable corrections were made to account for the known optical absorbance of water.

Figure 2:
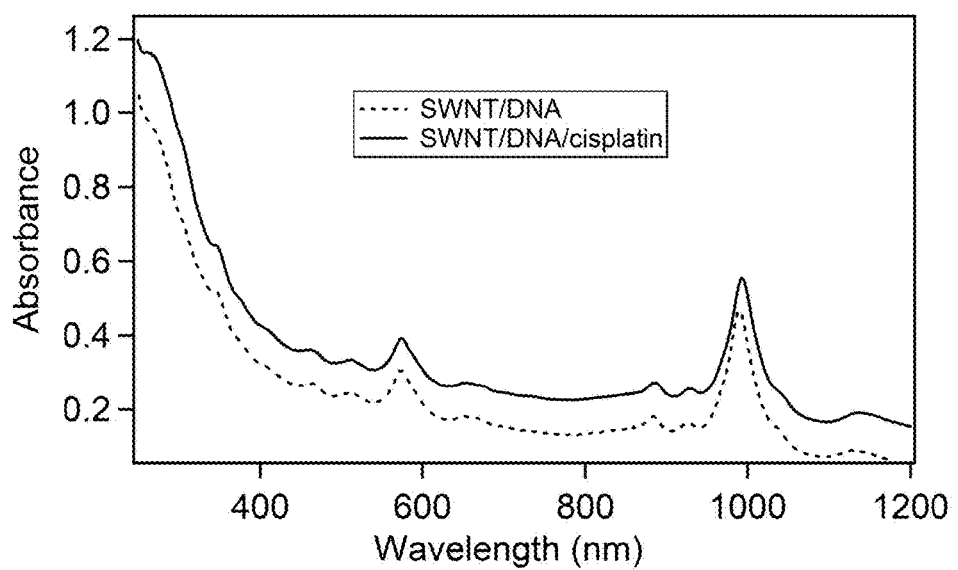
FIG. 2 shows exemplary optical absorbance spectra of SWNT/DNA and SWNT/DNA/cisplatin solutions after incubation for seven days. The curves are offset for clarity.

To better quantify the optical properties of the SWNT/DNA/cisplatin solutions, optical absorbance spectra were gathered following incubation. A comparison of the SWNT/DNA and SWNT/DNA/cisplatin optical absorbance spectra reveals that the SWNT spectral features remain intact (FIG. 2), thus demonstrating that SWNT solubilization is retained. More specifically, the near infrared peaks that belong to the lowest energy transitions of semiconducting SWNTs are retained and only slightly red-shifted (3 nm). The small magnitude (3 nm) of the red-shift suggests the dielectric environment surrounding the SWNT is only weakly perturbed following cisplatin binding.

Figure 5:
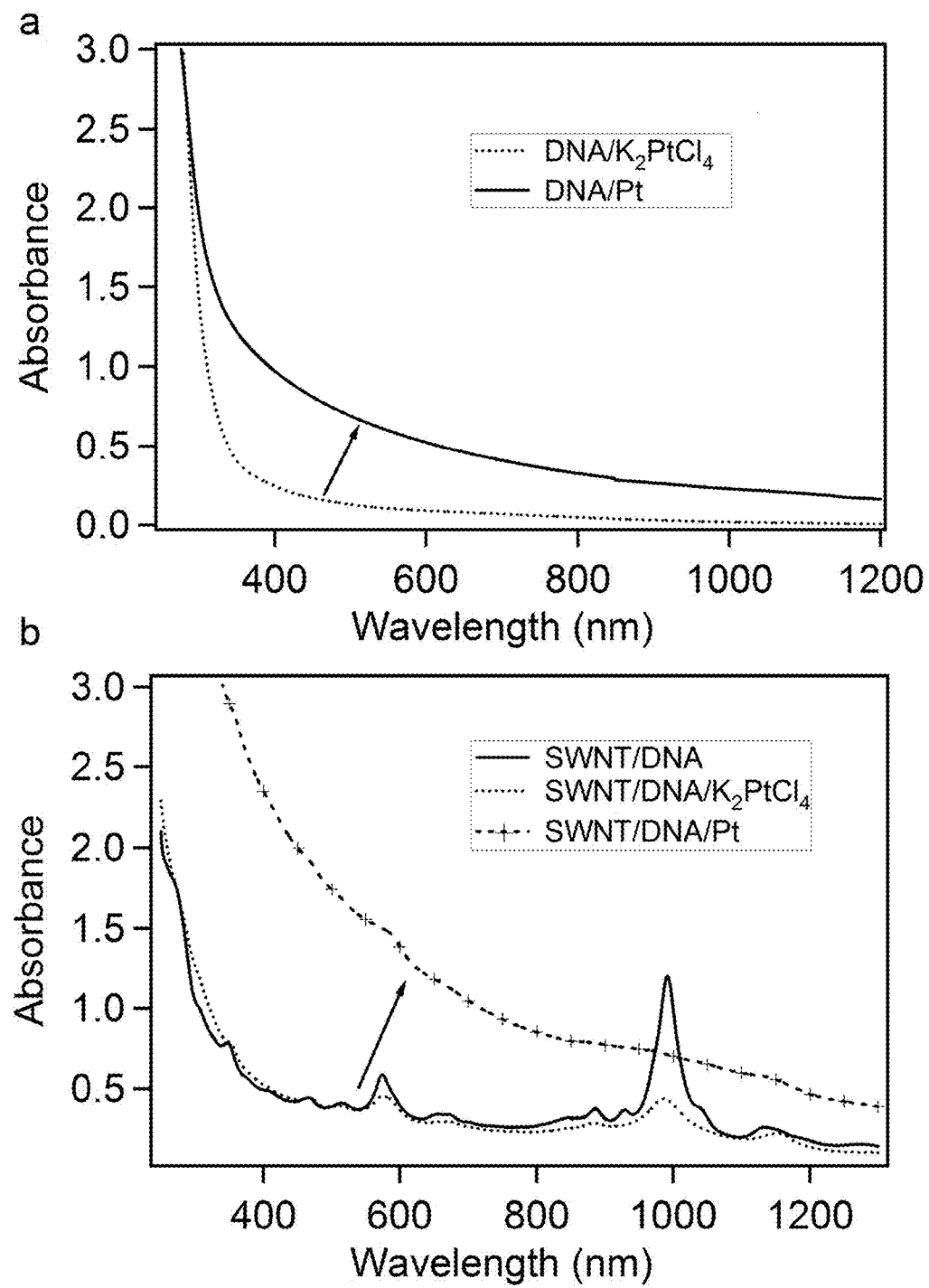
FIGS. 5a and 5b show exemplary optical absorbance spectra of DNA/$K_2PtCl_4$ (FIG. 5a) and SWNT/DNA/$K_2PtCl_4$ (FIG. 5b) before and after Pt reduction with DMAB.

Optical absorbance spectra of SWNT/DNA/$K_2PtCl_4$ samples before and after Pt reduction and the DNA/$K_2PtCl_4$ control are compared in FIG. 5. In both cases, the observed increase of absorbance and the appearance of an infrared tail are in accordance with the creation of metallic nanoparticles. More specifically, for the SWNT/DNA sample, introduction of $K_2PtCl_4$ leads to a blue-shift and broadening of the first order SWNT optical transitions due to the solution pH change from 6 to 4. Following Pt reduction with DMAB, the broadening and diminishing of both the first and second order SWNT optical transitions suggest strong coupling between the Pt nanoparticles and the SWNTs. The control DNA/$K_2PtCl_4$ sample shows increased absorbance and a characteristic metallic infrared tail after adding DMAB. On the other hand, before reduction, the SWNT/DNA/$K_2PtCl_4$ sample shows a superposition of SWNT and Pt salt peaks in the visible spectrum. In addition, there is a blue-shift, intensity decrease, and broadening of the first order optical transitions of the semiconducting SWNTs (wavelengths between 800 nm and 1200 nm) compared to the original SWNT/DNA sample. Since the addition of $K_2PtCl_4$ yields a pH drop from 6 to 4, the observed changes in the optical absorbance spectrum of the SWNT/DNA/$K_2PtCl_4$ are expected since similar pH-induced spectral effects have been reported for DNA-encapsulated nanotubes and surfactant-encapsulated SWNTs. This expectation is confirmed by probing SWNT/DNA/$K_2PtCl_4$ in pH buffered aqueous solutions, which do not show the described spectral effects. After Pt reduction with DMAB, the SWNT/DNA/Pt spectrum shows an overall metallic infrared tail absorbance increase, quenching of the first order SWNT optical transitions (800-1200 nm), and a decrease of the second order SWNT optical transitions (<800 nm). These effects suggest strong coupling between the Pt nanoparticles and the SWNTs, which introduces an efficient route for carrier relaxation and thus quenching of the sharp SWNT optical transitions.

Example 5: Characterization of Sample Solutions Using Circular Dichroism Measurements Circular dichroism (CD) was measured with a Jasco circular dichroism spectrometer (Keck Biophysics Facility, Northwestern University) at room temperature with a 0.5 nm step and a bandwidth of 1 nm in 0.5 cm quartz cuvettes.

Binding of cisplatin to DNA generally results in a bathochromic shift of the positive band and an overall decrease of the CD signal. Without wishing to be bound by any particular theory, these observations from CD are believed to be attributed to a DNA conformational change upon cisplatin binding to bases (preferentially guanine) and also has been confirmed for short oligonucleotides. To determine if similar conformational changes occur upon binding of cisplatin to SWNT/DNA, CD experiments were performed for SWNT/DNA and DNA control samples before and after cisplatin binding. While rotational asymmetry in CD measurements is not inherent for bare or surfactant encapsulated SWNTs, SWNT/DNA hybrids possess a CD signal that peaks at 258 nm and is shifted from the free DNA CD spectrum which peaks at ~280 nm. Previous work has established that this wavelength shift and the appearance of non-zero CD at longer wavelengths can be attributed to electronic interactions between DNA and SWNTs.

Figure 3:
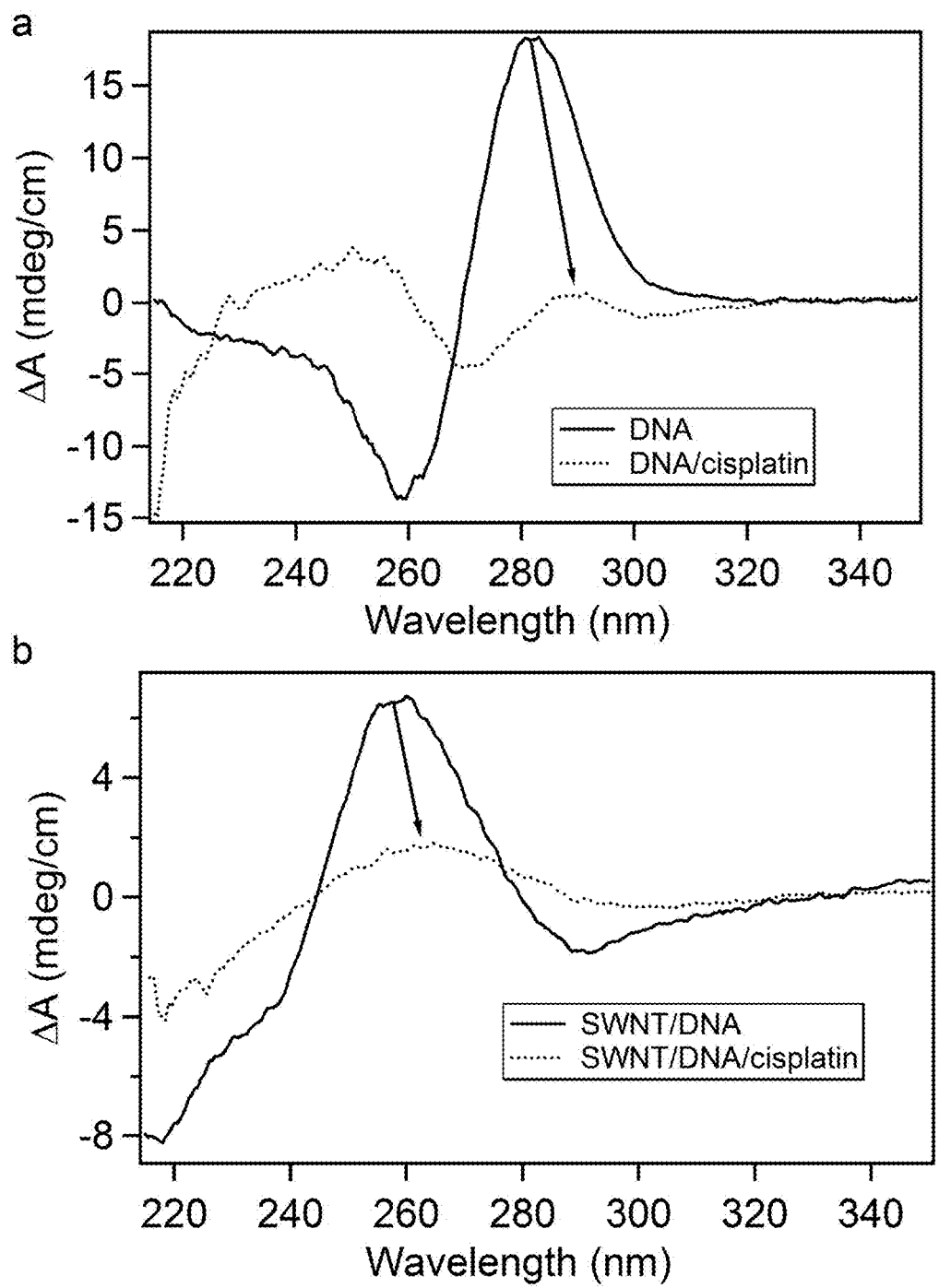
FIGS. 3a and 3b show circular dichroism spectra of free DNA (FIG. 3a) and SWNT/DNA (FIG. 3b) after three days of incubation with cisplatin (ΔA corresponds to the difference in optical absorbance of left and right circularly polarized light).

CD spectra of both DNA/cisplatin and SWNT/DNA/cisplatin following incubation for three days are shown in FIG. 3. Both the control DNA/cisplatin and the SWNT/DNA/cisplatin sample exhibit qualitatively similar behavior: red-shift and decrease of CD signal following incubation in agreement with previous reports for cisplatin binding to DNA. More specifically, the CD spectrum of SWNT/DNA is blue-shifted by ~24 nm compared to free DNA. Following incubation with cisplatin, a red-shift and decrease of CD signal is observed for both the control DNA and the SWNT/DNA solutions. These observations are consistent with the expected change in DNA conformation following binding with cisplatin. Due to the separated maxima positions of DNA only and DNA-wrapped SWNTs, the red-shift of the 258 nm CD peak can be definitively attributed to cisplatin bound to the SWNT/DNA complex. From the CD results, the conformational change appears to be larger for the free DNA than for DNA encapsulating the SWNTs, which is consistent with the more restricted geometry in the latter case.

Figure 6:
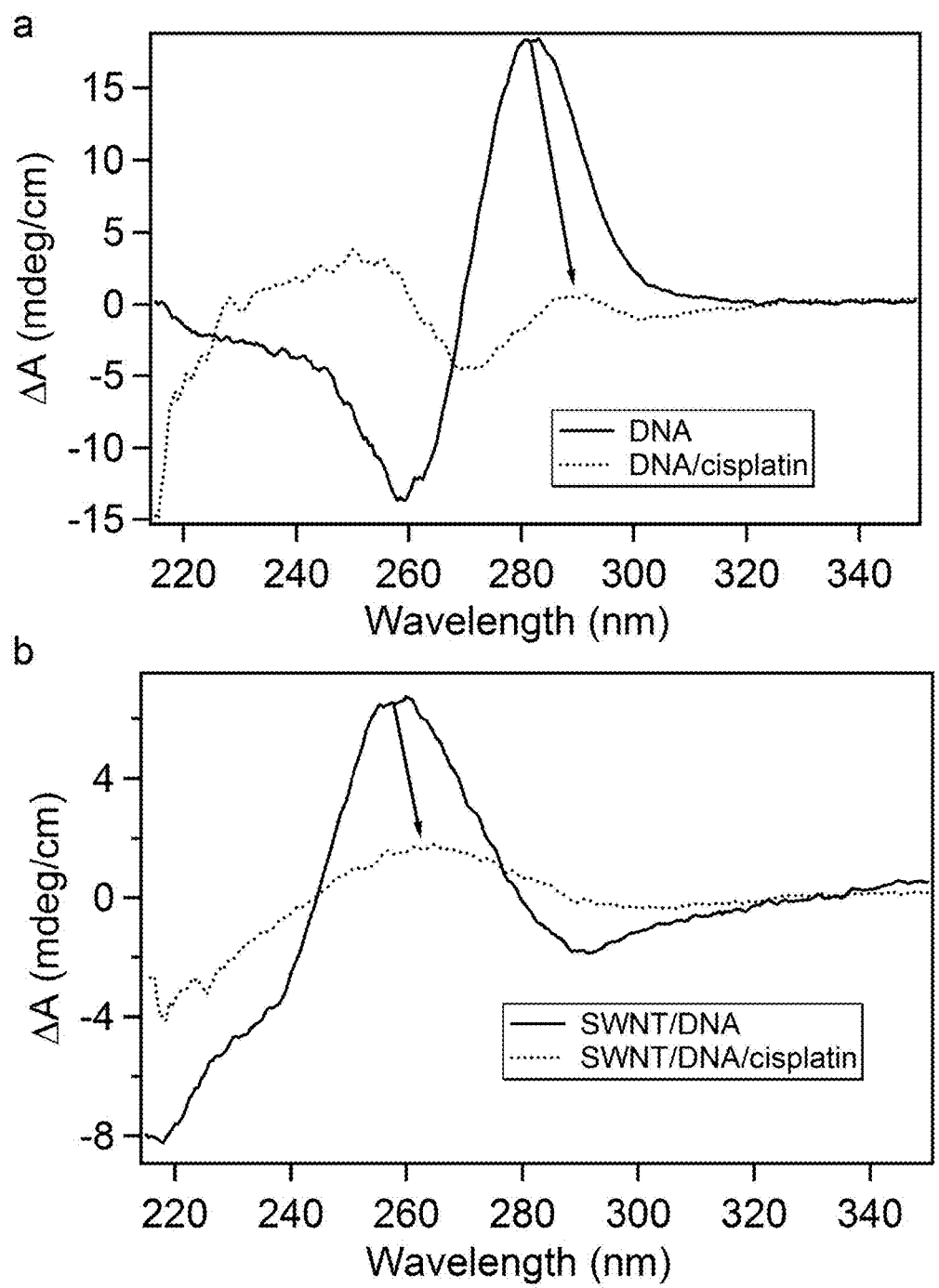
FIGS. 6a and 6b show circular dichroism spectra of DNA/$K_2PtCl_4$ (FIG. 6a) and SWNT/DNA/$K_2PtCl_4$ (FIG. 6b) after an incubation period of three days with potassium tetrachloroplatinate.

CD spectra of the control DNA/$K_2PtCl_4$ and SWNT/DNA/$K_2PtCl_4$ samples are shown in FIG. 6. The samples were measured preceding the addition of $K_2PtCl_4$ and after three days of incubation with $K_2PtCl_4$. A red-shift and decrease of the positive band was observed in both cases, thus suggesting that the DNA conformation was perturbed by $K_2PtCl_4$ in a similar fashion to cisplatin. This is somewhat expected because both cisplatin and potassium tetrachloroplatinate are cis-bidentate DNA binders that exhibit similar bathochromic shifts upon cross-linking. These results imply that Pt-based cross-linker binding to the SWNT/DNA hybrid is permitted even though the DNA conformation is restricted by the presence of the SWNT.

Example 6: Thin Film Preparation

Thin films were prepared by vacuum filtration on anodized alumina membranes with a 20 nm pore size (Whatman). A total of 0.75 mL of SWNT/DNA/Pt solution diluted 7.6-fold with deionized water was deposited uniformly on the 13 mm diameter membrane.

Example 7: Characterization of Sample Thin Films Using X-Ray Diffraction

To verify the formation of Pt nanocrystals, X-ray diffraction (XRD) was measured on films made by vacuum filtration with a Scintag diffractometer (J. B. Cohen X-Ray Diffraction Facility, Northwestern University) using the $K_\alpha$ copper line. After taking initial XRD measurements, the same film was annealed in air at 300° C. for 1 hour. After annealing, XRD was performed again for comparison. In both cases, the background obtained from a pristine anodized alumina disc was subtracted from the data.

Figure 7:
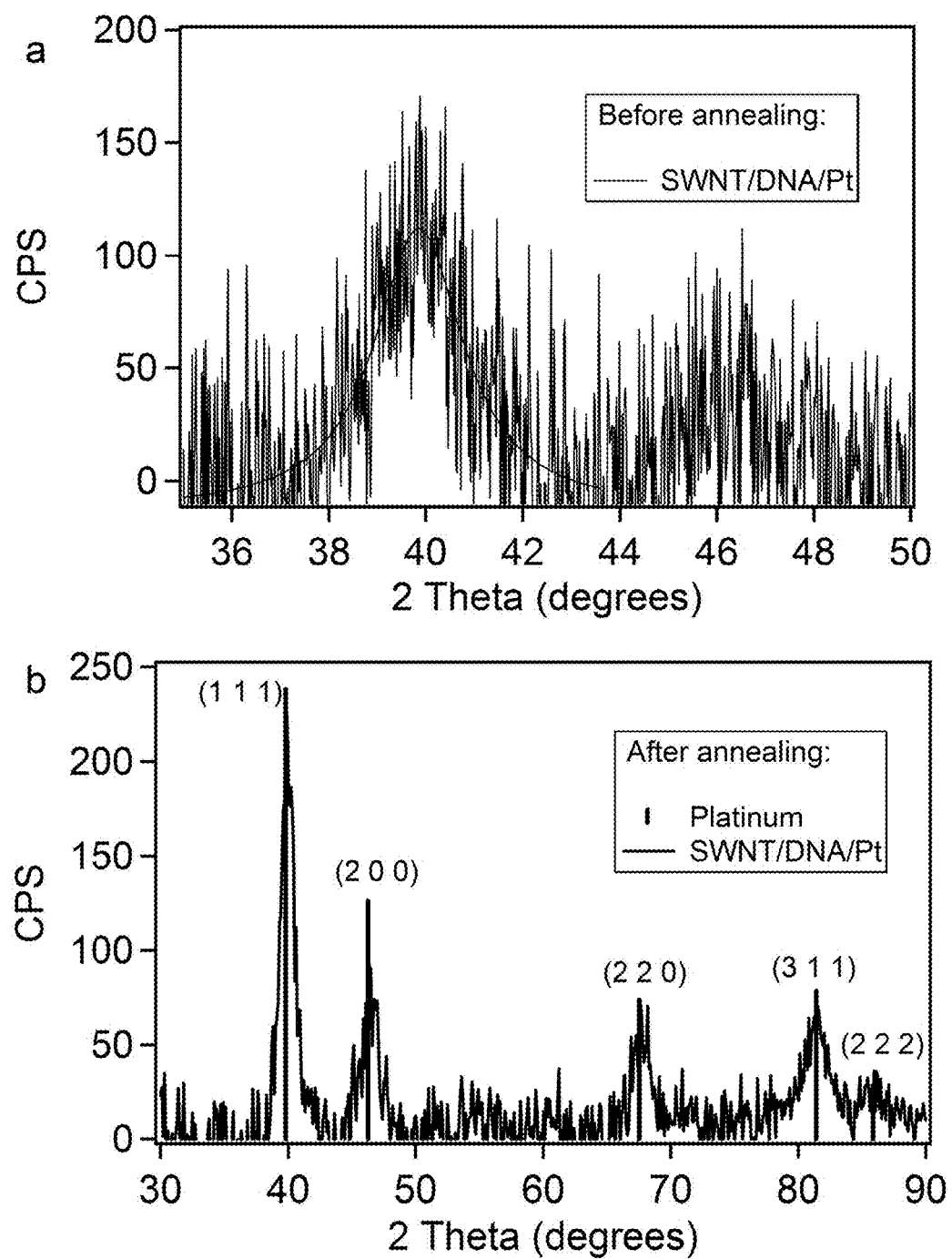
FIGS. 7a and 7b show X-ray diffraction spectra of thin films made from reduced SWNT/DNA/Pt samples before (FIG. 7a) and after (FIG. 7b) annealing at 300° C. for 1 hour (CPS=counts per second). For comparison purposes, the scaled scattering intensity of platinum from the ICDD database (PDF #00-004-0802) is shown in (b).

As observed from XRD spectra of thin films made from the reduced platinum SWNT/DNA/Pt samples before and after annealing at 300° C. for 1 hour (FIG. 7), the most intense scattering crystal planes (1 1 1) and (2 0 0) were observed from the pre-annealed sample. Following annealing, all of the platinum peaks were observed, and their position and intensity ratio matches the ICDD database for platinum (PDF #00-004-0802). Further, it was observed that annealing decreases the peak width, which implies an increase of crystal size because XRD peak intensity and width are dependent on the crystal size.

The most intense peak (1 1 1) is fitted by a Lorentzian function to obtain from the Scherrer equation the Pt nanocrystal size before and after annealing. Assuming a spherical geometry, the diameter of the Pt nanoparticles preceding annealing was 3.8 nm. Following annealing, the Pt nanoparticle size increased to 6.1 nm. This increase in nanoparticle size following annealing is expected due to diffusion and aggregation of Pt at elevated temperatures.

Example 8: Characterization of Sample Thin Films Using Atomic Force Microscopy Atomic force microscopy (AFM) samples were prepared as follows. A 10 μL volume of 10 mM magnesium chloride solution was deposited on freshly cleaved mica. The excess liquid was blown off with nitrogen after 10 seconds. Immediately after this procedure, 8 μL of sample solution (e.g., SWNT/DNA/$K_2PtCl_4$, SWNT/DNA/Pt, or DNA/Pt) was deposited for 2.5 minutes followed by a rinse with deionized water and blow dry with nitrogen gas. AFM measurements were performed with a Thermomicroscopes CP Research Atomic Force Microscope with Si tips (NSC36/Cr—AuBS, μmasch, Estonia) with a force constant of 0.6 N/m and a resonant frequency of 75 kHz. Topography images were recorded in intermittent contact mode.

AFM allows the position of the Pt nanoparticles to be determined relative to the SWNTs. In typical intermittent-contact AFM topography images obtained from reduced platinum SWNT/DNA/Pt samples, the SWNTs can be clearly identified due to their high aspect ratio and diameters of 1-2 nm, while the Pt nanoparticles appear as protrusions that decorate the SWNT surface. From line profiles taken along the SWNTs, the average nanoparticle height is measured to be 4.2 nm, which is consistent with the XRD results preceding annealing. In contrast, AFM imaging of the potassium tetrachloroplatinate samples preceding Pt reduction (i.e., SWNT/DNA/$K_2PtCl_4$) did not show nanoparticles as expected.

Example 9: Characterization of Sample Thin Films Using Raman Spectroscopy

Raman spectroscopy measurements were performed on a TriVista Raman System (Acton) with laser excitation of 568.2 nm from an Ar—Kr gas laser (Stabilite, Spectra-Physics). The solutions were measured in a 135 degree geometry with 20 mW laser power.

Figure 8:
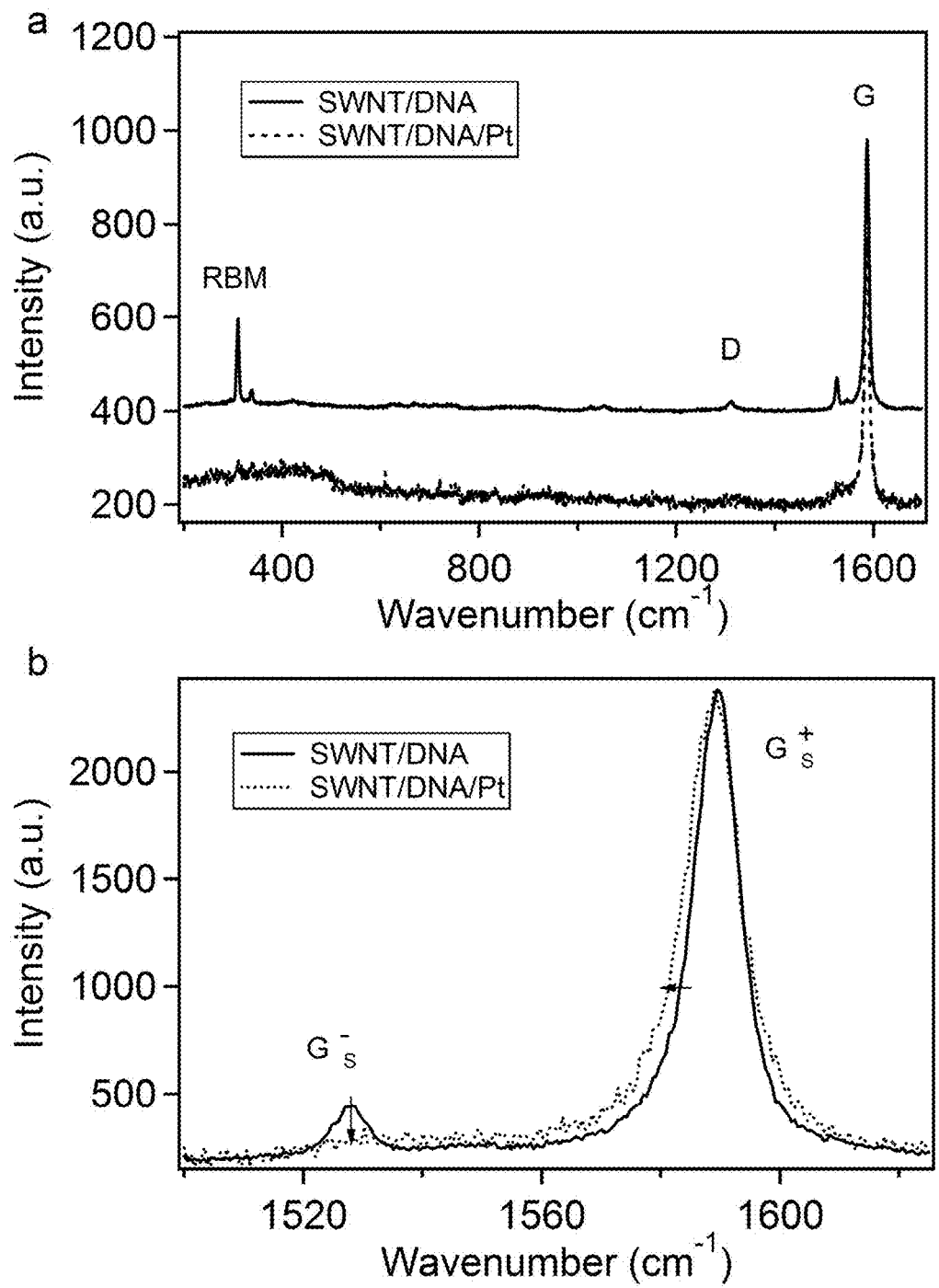
FIGS. 8a and 8b show Raman spectra of SWNT/DNA and SWNT/DNA/Pt hybrids in solution excited by a 568.2 nm laser, specifically from 200 $cm^{-1}$ to 1700 $cm^{-1}$ (FIG. 8a) and from 1500 $cm^{-1}$ to 1620 $cm^{-1}$ (FIG. 8b). Traces are scaled to match the intensity of the G mode peak.

Raman scattering results from DNA-encapsulated SWNTs (SWNT/DNA) and SWNT/DNA/Pt hybrids are provided in FIG. 8. Raman spectra allow the amount of damage to the SWNTs and their local environment to be probed. Diameter dispersive radial breathing modes (RBM) at 312 $cm^{-1}$ and 339 $cm^{-1}$ show that the (6,5) and (6,4) semiconducting SWNT chiralities were excited. However, the RBM peaks were almost completely diminished after Pt nanoparticle formation. The suppression of the RBM peaks is consistent with restricted vibration in the SWNT surface-normal direction following decoration with Pt nanoparticles. Another important feature in the Raman spectra is that the disorder mode (D), which is an indicator of the amount of damage to the SWNT surface, is unchanged following Pt nanoparticle formation. More specifically, the D mode peak at ~1308 $cm^{-1}$ indicates that the amount of SWNT disorder does not increase upon Pt formation.

The G band of the Raman spectrum is separately plotted in FIG. 8b. As previously reported for CoMoCAT SWNTs, two peaks are apparent in the G band: $G_s^+$ at ~1590 $cm^{-1}$ (overlapping with the metallic $G_m^+$ peak at 1580 $cm^{-1}$) and $G_s^-$ at 1527 $cm^{-1}$ that originate from the LO and TO vibrations of the semiconducting SWNTs respectively. In addition, broadening and increasing (more asymmetric) Breit-Wigner-Fano lineshape was observed for the $G_s^-$ mode following Pt nanoparticle formation, which implies increased electronic coupling to the SWNT. This observation agrees well with the diminished peaks observed in the optical absorbance data (FIG. 5). In addition, the $G_s^-$ mode was suppressed following Pt nanoparticle formation as in the case of the RBM. Overall, the Raman spectra are consistent with the formation of Pt nanoparticles on the SWNT surface.

Example 10: Platinum Density on DNA Encapsulated SWNTs

Atomic emission spectroscopy (AES) was used to determine the density of platinum on DNA-encapsulated SWNTs and to confirm the amount of metal precursors converted to nanoparticles after reduction.

Following procedures similar to those described in Example 3, precursor solutions having different Pt molarities were prepared. Specifically, solutions containing 10 mM $K_2PtCl_4$, 20 mM $K_2PtCl_4$, and 40 mM $K_2PtCl_4$ were mixed with a solution containing 0.5 mL of $(GT)_{10}$-encapsulated SWNTs in 3 mL of deionized water to obtain precursor solutions having a 1 mM Pt concentration (labeled as NTPt1), a 2 mM Pt concentration (labeled as NTPt2), and a 4 mM Pt concentration (labeled as NTPt3), respectively. After one week of incubation, these solutions were diluted 2-fold. Then, a heated solution of DMAB (50 mM) was added drop-wise to each of these solutions to match the molarity of potassium tetrachloroplatinate. After dialysis, the platinum nanoparticles were dissolved with aqua regia (13% nitric acid, 24% hydrochloric acid) for 4 hours at 60° C. to determine the Pt content of the various SWNT/DNA/Pt samples (Table 1).

TABLE 1

Platinum density in SWNT/DNA/Pt composite solutions as measured by atomic emission spectroscopy compared to the initial platinum density in the corresponding precursor solutions.

| Sample | Expected Pt density (mg/L) | Measured Pt density (mg/L) |
|---|---|---|
| NTPt1 (1 mM) | 3.18 | 2.66 |
| NTPt2 (2 mM) | 6.25 | 6.45 |
| NTPt3 (4 mM) | 12.5 | 12.44 |

Example 11: Hydrogen Sensitivity of SWNT/DNA/Pt Composite Thin Films

Thin films were prepared by vacuum filtration on anodized alumina membranes with a 20 nm pore size (Whatman). A total of 0.30 mL of each of the NTPt1, NTPt2, NTPt3 solutions was deposited uniformly on the 13 mm diameter membrane.

Figure 9:
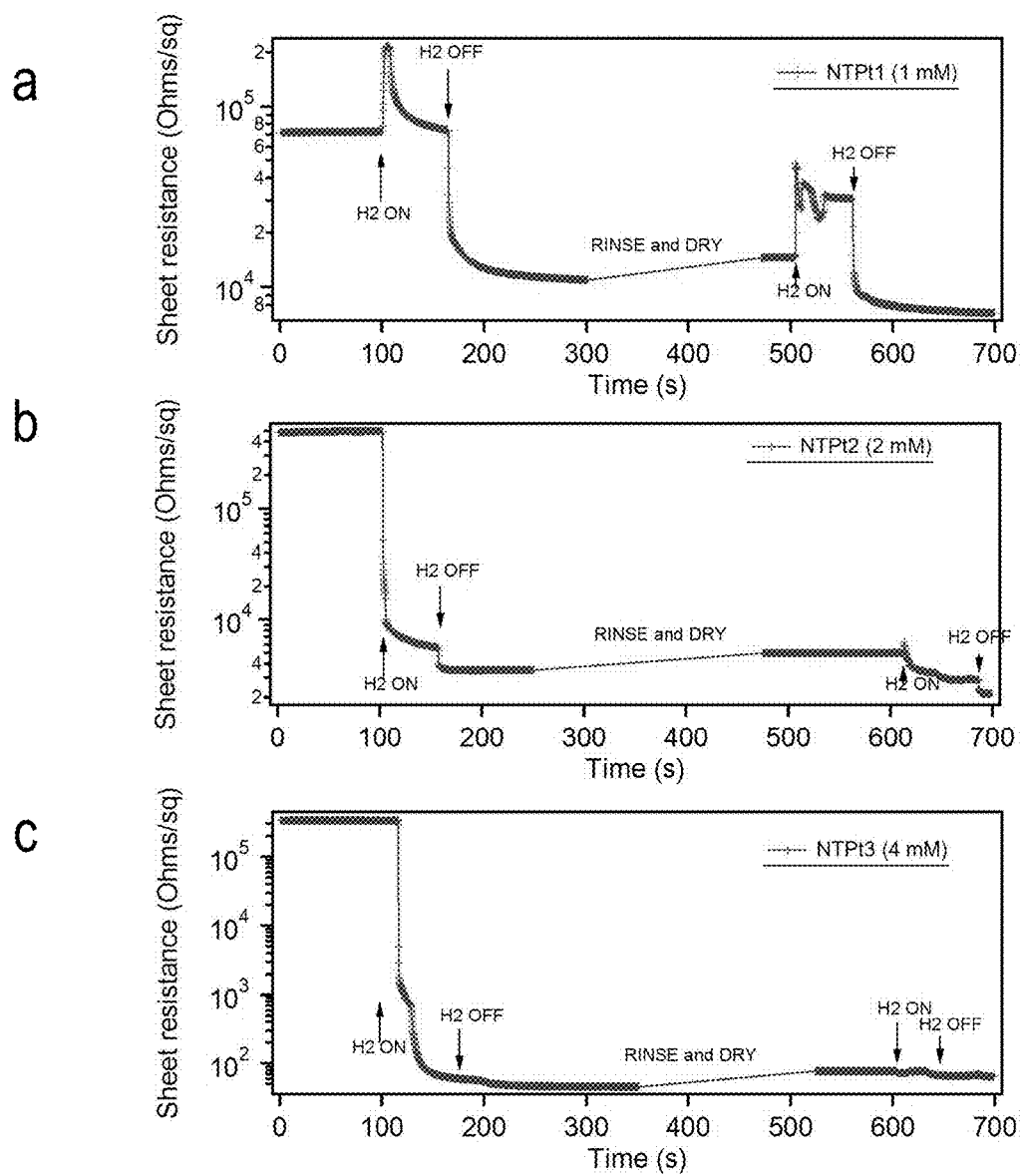
FIGS. 9a-9c plot the sheet resistance of thin films made from reduced platinum SWNT/DNA/Pt samples over time after exposure to hydrogen gas (5%). Thin film samples were made from reduced SWNT/DNA/Pt solutions having 1 mM Pt (FIG. 9a), 2 mM Pt (FIG. 9b), and 4 mM Pt (FIG. 9c), respectively.
Figure 10:
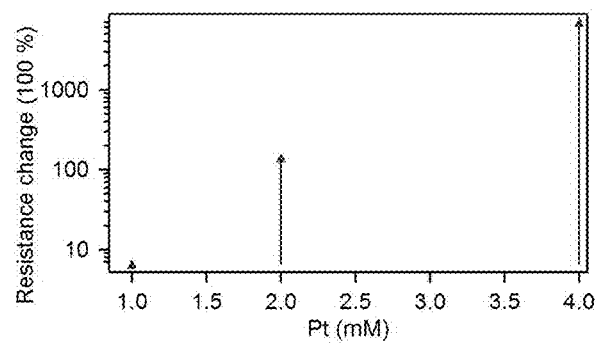
FIG. 10 summarizes the maximum change in sheet resistance for the three different amounts of platinum loading as shown in FIG. 9.

Sensitivity to hydrogen was tested for each film by measuring its electrical conductivity during exposure to hydrogen. Referring to FIG. 9, sheet resistance, as measured by four-point probe measurements, was observed to decrease dramatically (over 4 orders of magnitude) upon exposure to a gas mixture containing 5% hydrogen and 95% argon. Without wishing to be bound by any particular theory, it is believed that the decrease in resistance is due to the ability of platinum to adsorb and split hydrogen molecules, which results in a doping effect and makes the thin film samples more metallic. The change in sheet resistance appears to scale with the amount of platinum loading (FIG. 10). Further, hydrogen molecules appeared to bind tightly to the platinum nanoparticles and were retained on the films after rinsing with water. These results show that SWNT/DNA/Pt films are highly sensitive to hydrogen and demonstrate their potential use in hydrogen sensors.

Example 12: Characterization of SWNT/DNA/Pt Composite Thin Films Using Scanning Electron Microscopy SWNT/DNA/Pt composite thin films prepared according to Example 11 were imaged with scanning electron microscopy (SEM). The SEM images show that the thin films are characterized by a smooth surface with well-dispersed Pt nanoparticles on a SWNT network. In addition, the SEM images confirm that the size and coverage of the Pt nanoparticles correlate with the precursor density.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A composite, comprising:
   a carbon nanotube;
   a biological moiety non-covalently bound to a sidewall of the nanotube, wherein the biological moiety is single-stranded DNA; and
   a metallic moiety intrastrand crosslinking the biological moiety and bound to said biological moiety, wherein the metallic moiety comprises a transition metal selected from the group consisting of scandium, titanium, titanium, vanadium, chromium, manganese, iron, zinc, yttrium, zirconium, niobium, molybdenum, technetium, ruthenium, rhodium, palladium, cadmium, lanthanum, hafnium, tantalum, tungsten, rhenium, osmium, iridium, mercury, actinium, rutherfordium, dubnium, seaborgium, bohrium, hassium, meitnerium, darmstadtium, roentgenium, and copernicium.

2. The composite of claim 1, wherein the nanotube is a single-walled carbon nanotube or a multi-walled carbon nanotube.

3. The composite of claim 1, wherein the metallic moiety is a metal nanoparticle.

4. A dispersion comprising a plurality of the composites of claim 1 in a solvent.

5. The composite of claim 1 incorporated into an article of manufacture.

6. A composite, comprising:
   a pristine carbon nanotube, said nanotube not acid oxidized;
   a biological moiety non-covalently bound to a sidewall of the nanotube, wherein the biological moiety is single-stranded DNA; and
   a metallic moiety intrastrand crosslinking the biological moiety and bound to said biological moiety, wherein the metallic moiety comprises a transition metal selected from the group consisting of scandium, titanium, titanium, vanadium, chromium, manganese, iron, zinc, yttrium, zirconium, niobium, molybdenum, technetium, ruthenium, rhodium, palladium, cadmium, lanthanum, hafnium, tantalum, tungsten, rhenium, osmium, iridium, mercury, actinium, rutherfordium, dubnium, seaborgium, bohrium, hassium, meitnerium, darmstadtium, roentgenium, and copernicium.

7. The composite of claim 6, wherein the nanotube is a single-walled carbon nanotube or a multi-walled carbon nanotube.

8. The composite of claim 6, wherein the metallic moiety is a metal nanoparticle.

9. A method of functionalizing a nanotube, comprising:
   contacting a mixed population of nanotubes with one or more surface active components in a solvent,
      wherein the mixed population of nanotubes comprise a range of at least one of chirality, nanotube diameter, and electronic type,
      wherein the one or more surface active components disperse the nanotubes and associate with individual nanotubes, and
      wherein individual nanotubes differing by at least one of chirality, nanotube diameter, and electronic type when associated with the one or more binding moieties have different buoyant densities in the solvent;
   introducing the dispersion into a fluid medium comprising a density gradient;
   agitating the fluid medium to separate along the density gradient the nanotubes by at least one of chirality, nanotube diameter, and electronic type;
   allowing nanotubes differing by at least one of chirality, nanotube diameter, and electronic type to sediment into a plurality of separable fractions;
   collecting a separation fraction from the plurality of separable fractions;
   non-covalently binding a biological moiety with a sidewall of a nanotube in the separation fraction, the biological moiety being single-stranded DNA; and
   intrastrand crosslinking a metallic moiety to the biological moiety and binding said metallic moiety to said biological moiety.

10. The method of claim 9, wherein the metallic moiety is a metal nanoparticle.

* * * * *